(12) United States Patent
Stockton

(10) Patent No.: US 6,177,986 B1
(45) Date of Patent: Jan. 23, 2001

(54) METHOD OF TESTING A LENS HAVING VARIABLE FIELD ANGLES

(75) Inventor: Thomas L. Stockton, Holley, NY (US)

(73) Assignee: Eastman Kodak Company, Rochester, NY (US)

(*) Notice: Under 35 U.S.C. 154(b), the term of this patent shall be extended for 0 days.

(21) Appl. No.: 09/387,584

(22) Filed: Aug. 31, 1999

(51) Int. Cl.⁷ ..................................................... G01B 9/00
(52) U.S. Cl. ........................... 356/124; 356/125; 356/126
(58) Field of Search ................................... 356/124, 125, 356/126

(56) References Cited

U.S. PATENT DOCUMENTS

| | | |
|---|---|---|
| 4,272,190 | 6/1981 | Shapiro . |
| 4,274,737 | 6/1981 | Howland . |
| 5,048,000 | 9/1991 | Tsuji et al. . |
| 5,500,767 | 3/1996 | Maruyama et al. . |
| 5,621,520 | 4/1997 | Hoffman . |

Primary Examiner—Frank G. Font
Assistant Examiner—Reginald A. Ratliff
(74) Attorney, Agent, or Firm—Clyde E. Bailey, Sr.

(57) ABSTRACT

An assemblage and method for testing a lens having a plurality of field angles employs an improved modulation transfer function (MTF) design system for evaluating image quality produced by the lens being tested. A reflecting surface capable of translational and rotational movements is arranged along a predetermined optical path for receiving a collimated array of light rays and then directing the collimated array of light rays to the lens being tested.

5 Claims, 5 Drawing Sheets

METHOD OF TESTING A LENS HAVING VARIABLE FIELD ANGLES

FIELD OF THE INVENTION

The invention relates to a method for measuring performance characteristics of lenses. More particularly, the invention concerns an apparatus and method for testing the image quality of a lens using an improved modulation transfer function (MTF) test system.

BACKGROUND OF THE INVENTION

Electronic methods have largely replaced visual methods, such as resolving power, for testing lens in the industry. Presently many in the photographic and optical industries custom build electronic systems, typically either analog or digital modulation transfer function (MTF) designs, for testing lenses being produced in high volume. These lenses have thus far been manufactured with fixed, predetermined magnifications.

Modulation transfer function (MTF) design systems are characterized by a graphical representation of image contrast relative to the pattern contrast over a range of spatial frequencies, where high frequency in the test pattern corresponds to small detail in an object. As shown in FIG. 1, existing MTF design systems 1 typically include the following major elements: the test pattern arranged at the object plane 2; the lens 4 under test; and, the displaceable detector 40 (displacement noted by arrow) at the image plane 8. An important advantage of MTF design systems is that they provide information about image quality over a range of frequencies rather than just at the limiting frequency as does other conventional methods, such as resolving power. For many fixed magnification lenses, these test patterns are placed at fixed positions in the object plane. Moreover, the long conjugate distance d, i.e., the distance from the object plane 2 to the lens 4 shown FIGS. 1, 3 and 4, are also predetermined or fixed with fixed magnification lens.

Referring to FIG. 2, illustrated is a schematic diagram of a typical optical test pattern 10 imaged at the object plane (not shown). The test pattern 10 is imaged by the particular lens under test on the detector (not shown) at the image plane. The detector (40), preferably a charge coupled device (CCD), is generally moved in the direction of the optical axis and the image is analyzed in terms of modulation transfer function (MTF) as a measure of image quality. It should be appreciated that for a fixed magnification lens to be tested, such as wide angle and telephoto lenses, test patterns are placed at fixed positions in the object plane.

Referring to FIG. 3, a schematic diagram of a prior art wide-angle, fixed magnification lens is illustrated. Wide angle lens typically have a field angle, i.e. the angle between the axis test pattern and the field test pattern, between 15 and 20 degrees. Two things in the test system generally need to change when the lens changes from wide to telephoto. First, the field angle needs to change because the lens will have different fields of view from wide to telephoto. Those skilled in the art will appreciate the desire to want to test the lens at some percentage of the total field. Second, the spatial frequency of the test pattern must change to account for the different magnification when the lens goes from wide to telephoto.

Referring to FIG. 4, a schematic diagram of a prior art telephoto, fixed magnification lens with typical field angles of 4 to 6 degrees is illustrated.

Skilled artisans will appreciate that for zoom lenses a different set of test criteria must be employed. This is because the more versatile zoom lens has a variable focal length that must be tested at more that one zoom setting. Thus, the position of the test patterns in the MTF design system need to change to accommodate the changing field of view. Further, the test pattern spatial frequency also needs to change to keep the spatial frequency at the image plane appropriate for the lens and the detector.

Accordingly, a major shortcoming of current methods for testing image capabilities of lenses, such as zoom lenses that are to be tested at more than one zoom setting, is the position of the test patterns needed to change to accommodate the changing field of view. Moreover, another problem associated with present methods and systems for testing such lenses is that the test pattern spatial frequency also needs to change to keep the spatial frequency at the image plane appropriate for the lens and the detector.

Therefore, a need persists for an apparatus and method for testing lenses that incorporate improvements to the digital system to accommodate the testing of lenses having variable focal lengths.

SUMMARY OF THE INVENTION

It is, therefore, an object of the invention to provide a method for testing a lens that can vary the spatial test frequency and field angle for a lens being tested.

It is another object of the invention to provide a method for testing a lens that permits infinitely variable field angles of the lens being tested.

Yet another object of the invention is to provide a method for testing a lens that uses a reflecting surface arranged in a predetermined optical path which translates and rotates so the field angle of the lens being tested can change and still use the same test pattern system.

It is a feature of the invention that a flexibly mounted reflecting surface and a rotatable support plate containing a plurality of test patterns are arranged in a predetermined optical path contains a plurality of test patterns each having a distinct single spatial frequency for imaging by the lens being tested.

The present invention is directed to overcoming one or more of the problems set forth above. Briefly summarized, according to one aspect of the present invention, a method of testing a lens having a plurality of field angles characteristic of the magnification of said lens, comprising the steps of:

providing a platform for holding at least one test pattern;

providing means to illuminate one of said at least one test pattern;

providing a reflecting surface capable of rotating and translating movements about an optical path defined by a beam of light having a predetermined optical path, said beam of light having been converted to a collimated array of light rays by a collimating lens arranged in said optical path between said at least one test pattern and said reflecting surface;

illuminating one of said at least one test pattern with a beam of light, said beam of light passing through said at least one test pattern and then said collimating lens thereby forming a collimated array of light rays; and, reflecting said collimated array of light rays off said reflecting surface arranged at a first position and then directing said collimated array of light rays through said lens at a first field angle to form a first image at a first image plane;

translating and rotating said reflecting surface along said optical path to a second position; and, reflecting said collimated array of light rays off said reflecting surface and then directing said collimated array of light rays through said lens at a second field angle to form a second image at a second image plane.

It is an advantageous effect that the apparatus of the invention can perform lens testing at any field angle and many magnifications without the need to build a separate tester for each lens.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

DETAILED DESCRIPTION OF THE INVENTION

Figure 1:
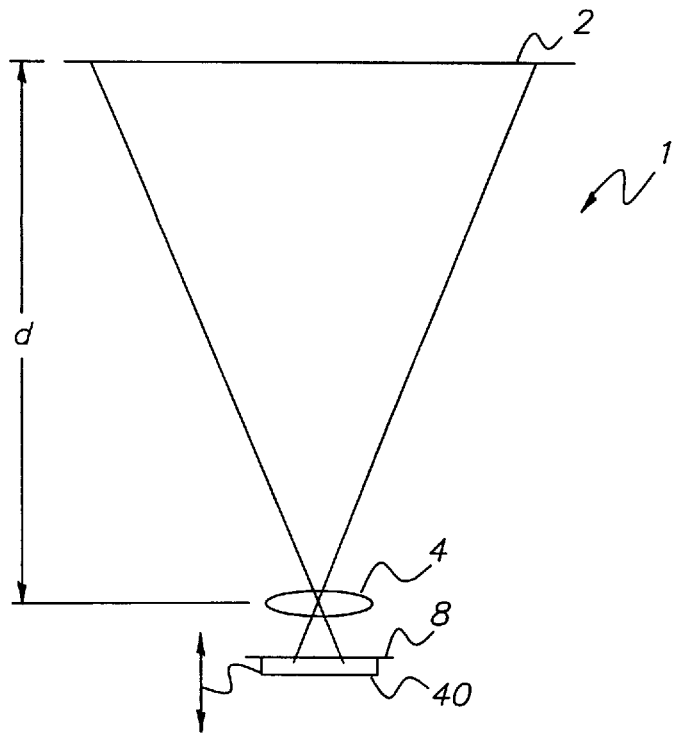
FIG. 1 is a prior art MTF design system.
Figure 2:
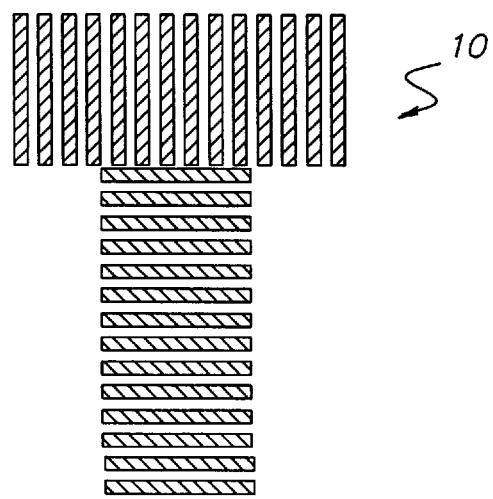
FIG. 2 is a prior art schematic diagram of a test pattern imaged on an image plane.
Figure 3:
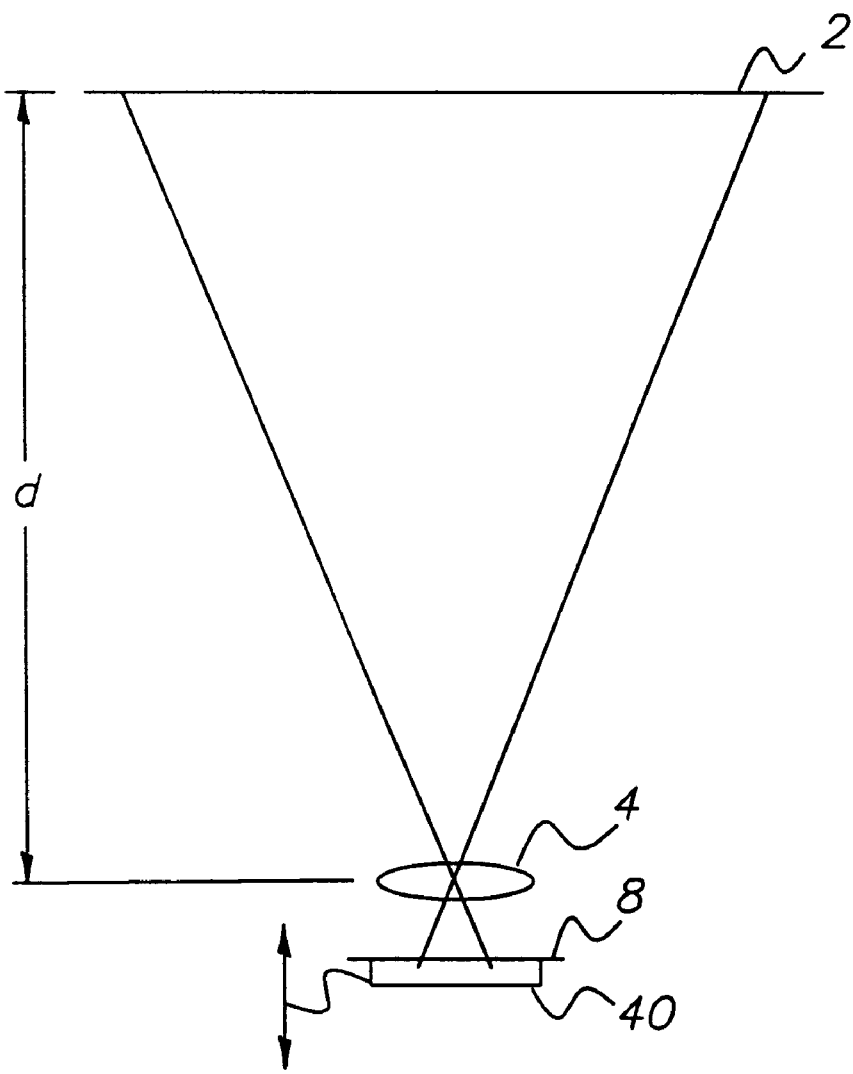
FIG. 3 is prior art schematic diagram of a wide-angle lens.
Figure 4:
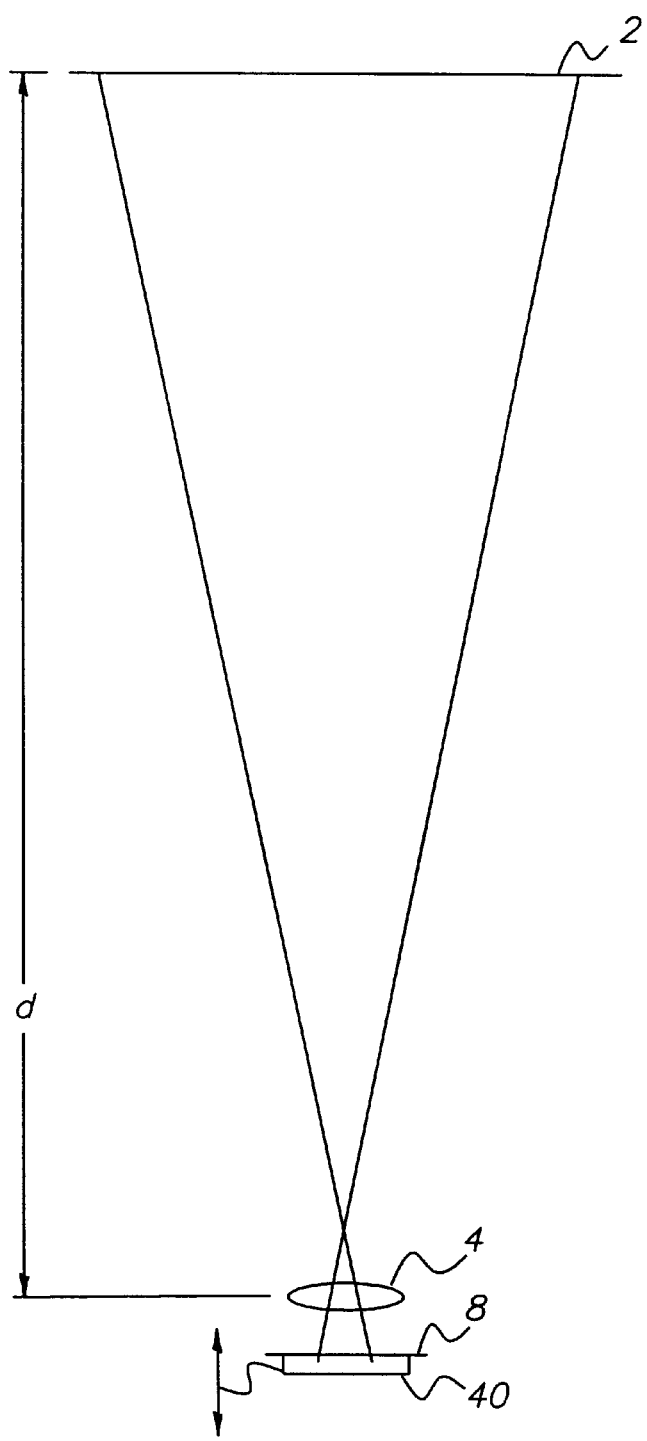
FIG. 4 is a prior art schematic diagram of a telephoto lens.
Figure 5:
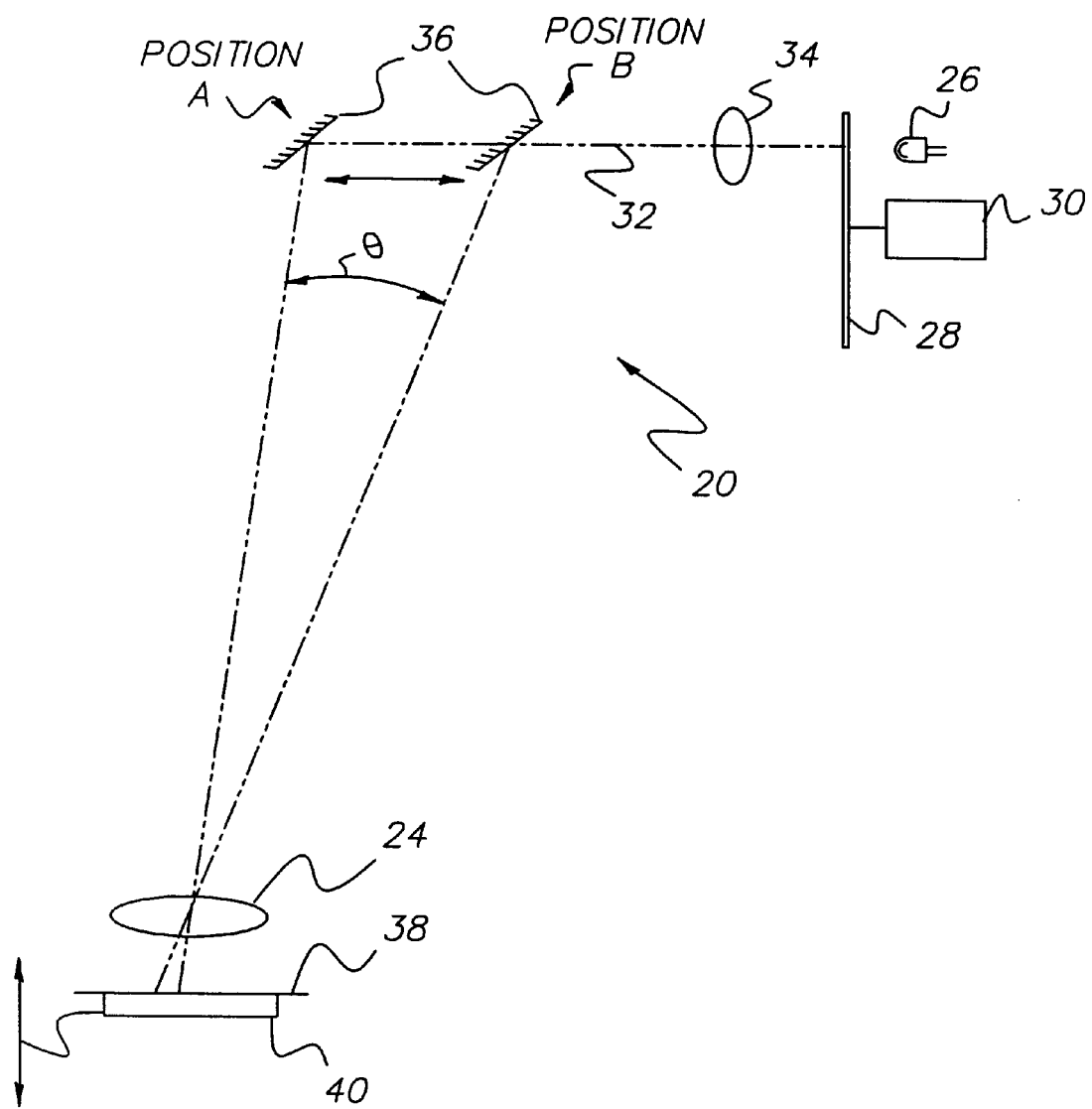
FIG. 5 is schematic diagram of the apparatus of the invention for testing a lens; and, FIG. 6 is an enlarged top plane view of the metallic plate wheel of the invention.

Turning now to the drawings, and particularly to FIG. 5, apparatus 20 for testing a lens 24 having a plurality of field angles according to the principles of the invention is illustrated. The plurality of field angles is achieved by translating and rotating a reflecting surface or mirror 36 (described below) in order to change the angle that a collimated beam of light along predetermined optical path 32 (described below) is presented to the lens being tested. FIG. 5 shows two possible positions for the mirror 36. As the mirror 36 is translated from position A to position B, it is also rotated so that the collimated beam is reflected to the lens under test 24. The mirror 36 could be positioned at any of an infinite number of positions so that the combination of the linear position and angle of the mirror 36 directs the collimated light 32 from the collimating lens 34 to the lens under test 24. For illustrative purposes, only one mirror 36 is shown in FIG. 5. In a preferred embodiment of the invention, however, at least two mirrors 36 are used to extend the test to multiple field positions.

Figure 6:
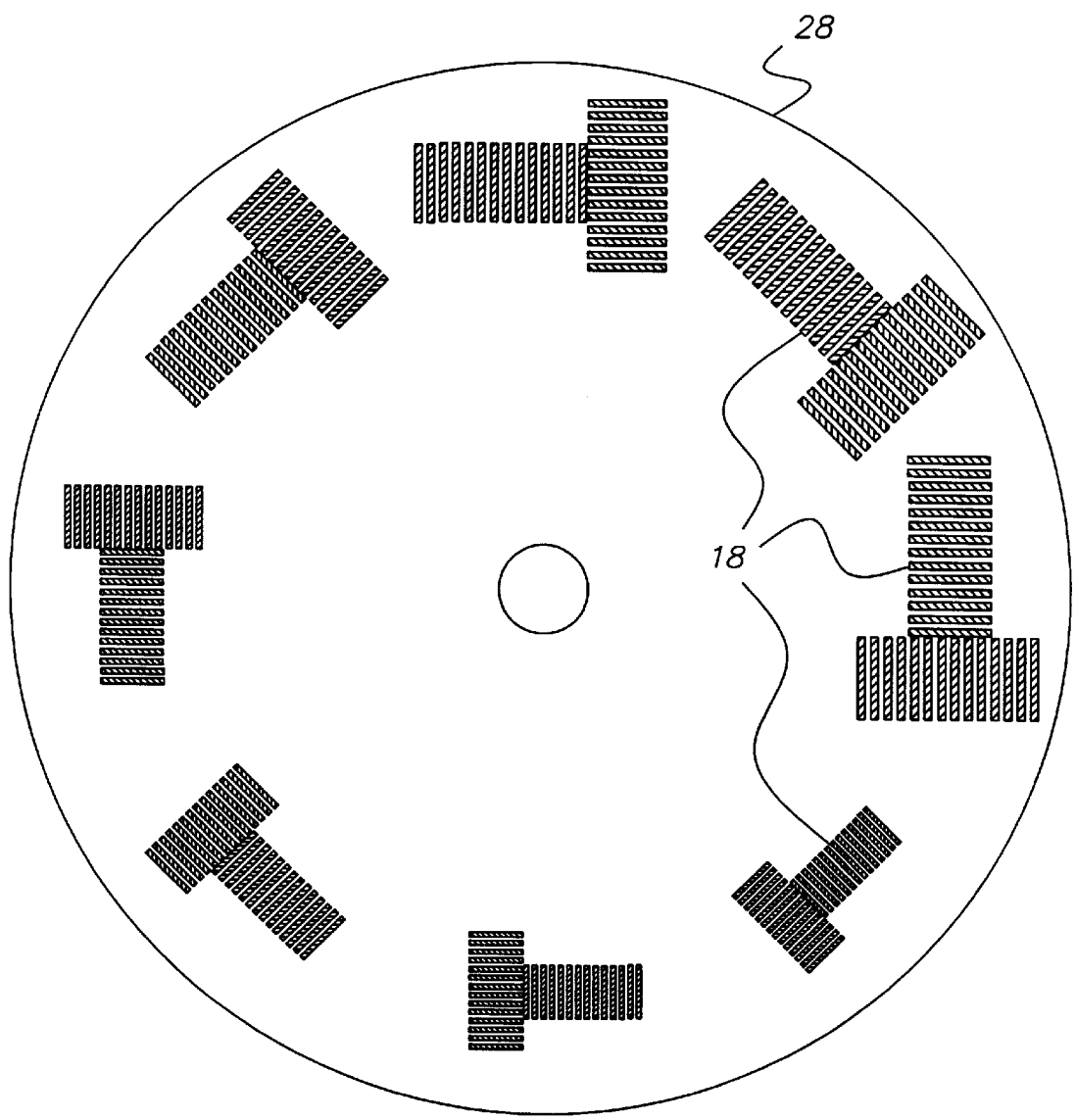

It is important to the invention that apparatus 20 can vary the spatial test frequency for a lens 24 being tested having variable field angles. The spatial test frequency of the test pattern is the number of line pairs (one dark and one light) per some distance. This is normally given as cycles (one line pair) per millimeter. FIG. 6 shows a round metallic plate with test patterns made of chromed glass with the test pattern etched out of the chrome. Each test pattern consists of two sets of parallel lines at right angles to each other. These two orientations are to allow both sagittal and tangential testing of the lens 24 being tested.

Referring to FIG. 5, apparatus 20 includes a source of illumination 26 for emitting light and a support means, preferably a rotatable platform 28, for supporting a plurality of spatially separated test patterns or objects 18 (shown in FIG. 6).

Further referring to FIG. 5, the rotatable platform 28 is arranged in apparatus 20 so that one of the plurality of test patterns or objects 18 can be illuminated by the light source 26. Platform 28 is preferably rotated by motor drive 30 although other means may be used with similar results. Importantly, motor drive 30 must be capable of rotating platform 28 so as to position any one of the plurality of test patterns or objects 18 in a predetermined optical path 32 for varying the spatial test frequency of the test patterns or objects 18. More particularly, preferably platform 28 is a metallic plate wheel mounted on a rotation stage with cut-outs or recesses (FIG. 6) for the chrome-on-glass single frequency test patterns. This arrangement enables the spatial frequency at the displaceable detector 40 be maintained in an appropriate range for the lens 24 being tested at a particular zoom setting. As will be appreciated, the metallic plate wheel has multiple test patterns 18 of different spatial frequencies. Consequently, the appropriate spatial frequency pattern for the current zoom setting can be rotated into the optical path 32.

Referring again to FIG. 5, a collimating lens 34 is arranged in the predetermined optical path 32 for receiving the light transmitted through any one of the plurality of test patterns 18. Further, collimating lens 34 converts the light to a collimated array of light rays. The collimating lens 34 makes the test pattern appear to be at infinity no matter what the zoom setting happens to be.

Instead of having the test patterns 18 at a fixed location in an MTF system, the field angle (shown in FIG. 5) can be varied by using a substantially flat reflecting surface 36, preferably a polished mirror, that translates (noted by arrows) and rotates about a fixed axis defined by optical path 32. As shown in FIG. 5, single reflecting surface 36 is shown in two different positions A and B. The translation and rotation of this reflecting surface 36 serves to change the field angle of the lens 24 being tested while keeping the collimated beam of light directed at lens 24 under test. According to this configuration, the selected test pattern 18 would always appear to be at infinity due to the collimating lens 34. The test pattern assembly, i.e., the rotating test pattern platform 28 and test patterns 18, are the preferred single frequency chrome-on-glass with heat glass and color correctors. This assembly would allow zoom lenses to be tested anywhere in their zoom range in one test fixture. Advantageously, this allows the lens 24 to be digitally tested at multiple zoom positions on a single test station.

Referring still to FIG. 5, substantially flat reflecting surface or mirror 36 is arranged in the predetermined optical path 32 for receiving the collimated array of light rays passing through collimating lens 34. According to the invention, the mirror 36 is capable of translational and rotational movements about an axis defined by the predetermined optical path 32. Translational and rotational movements of mirror 36 is accomplished by preferably a motor drive (not shown). These movements enable the mirror 36 to reflect and then direct the collimated array of light rays through the lens 24 being tested. An important advantage of translational and rotational mirror 36 is that it compensates for varying field angles of lens 24 and enables the use of a single test pattern system.

Further with reference to FIG. 5, the image (not shown) produced by the lens 24 being tested defines an image plane 38. This image can be detected by a detector 40, preferably a charge coupled device (CCD), arranged proximate to the image plane 38 for detecting the image produced by the lens 24 being tested.

The invention, therefore, has been described with reference to preferred embodiments thereof. However, it will be appreciated that variations and modifications can be effected by a person of ordinary skill in the art without departing from the scope of the invention.

PARTS LIST

- θ field angle
- d distance from object plane to lens
- 1 MTF design system
- 2 object (test pattern) plane
- 4 lens
- 8 image plane
- 10 typical optical test pattern
- 18 test patterns or objects
- 20 apparatus
- 24 lens being tested
- 26 source of illumination
- 28 rotatable platform
- 30 motor drive
- 32 optical path
- 34 collimating lens
- 36 reflecting surface or mirror
- 38 image plane
- 40 displaceable detector

What is claimed is:

1. Method of testing a lens having a plurality of field angles characteristic of the magnification of said lens, comprising the steps of:

providing a platform for holding at least one test pattern;

providing means to illuminate one of said at least one test pattern;

providing a reflecting surface capable of rotating and translating movements about an optical path defined by a beam of light having a predetermined optical path, said beam of light having been converted to a collimated array of light rays by a collimating lens arranged in said optical path between said at least one test pattern and said reflecting surface;

illuminating one of said at least one test pattern with a beam of light, said beam of light passing through said at least one test pattern and then said collimating lens thereby forming a collimated array of light rays; and, reflecting said collimated array of light rays off said reflecting surface arranged at a first position and then directing said collimated array of light rays through said lens at a first field angle to form a first image at a first image plane;

translating and rotating said reflecting surface along said optical path to a second position; and, reflecting said collimated array of light rays off said reflecting surface and then directing said collimated array of light rays through said lens at a second field angle to form a second image at a second image plane.

2. The method recited in claim 1 further comprising the step of detecting said first and second images.

3. The method recited in claim 2 wherein said step of detecting comprises the step of providing a charge couple device proximate to said first and second images for detecting said first and second images.

4. The method recited in claim 1 wherein said step of reflecting and directing said collimated array of light rays is achieved by the step of providing a translating and rotating reflecting surface in said predetermined optical path downstream of said collimating lens.

5. The method recited in claim 1 further including prior to the step of translating and rotating said reflecting surface, the step of rotating said platform so as to align and illuminate another test pattern in said optical path, said test pattern having a characteristic spatial frequency.

* * * * *